Nov. 17, 1953 T. H. McCLAIN 2,659,615
DUAL HYDRAULIC SWIVEL JOINTS
Filed June 21, 1949 2 Sheets-Sheet 1
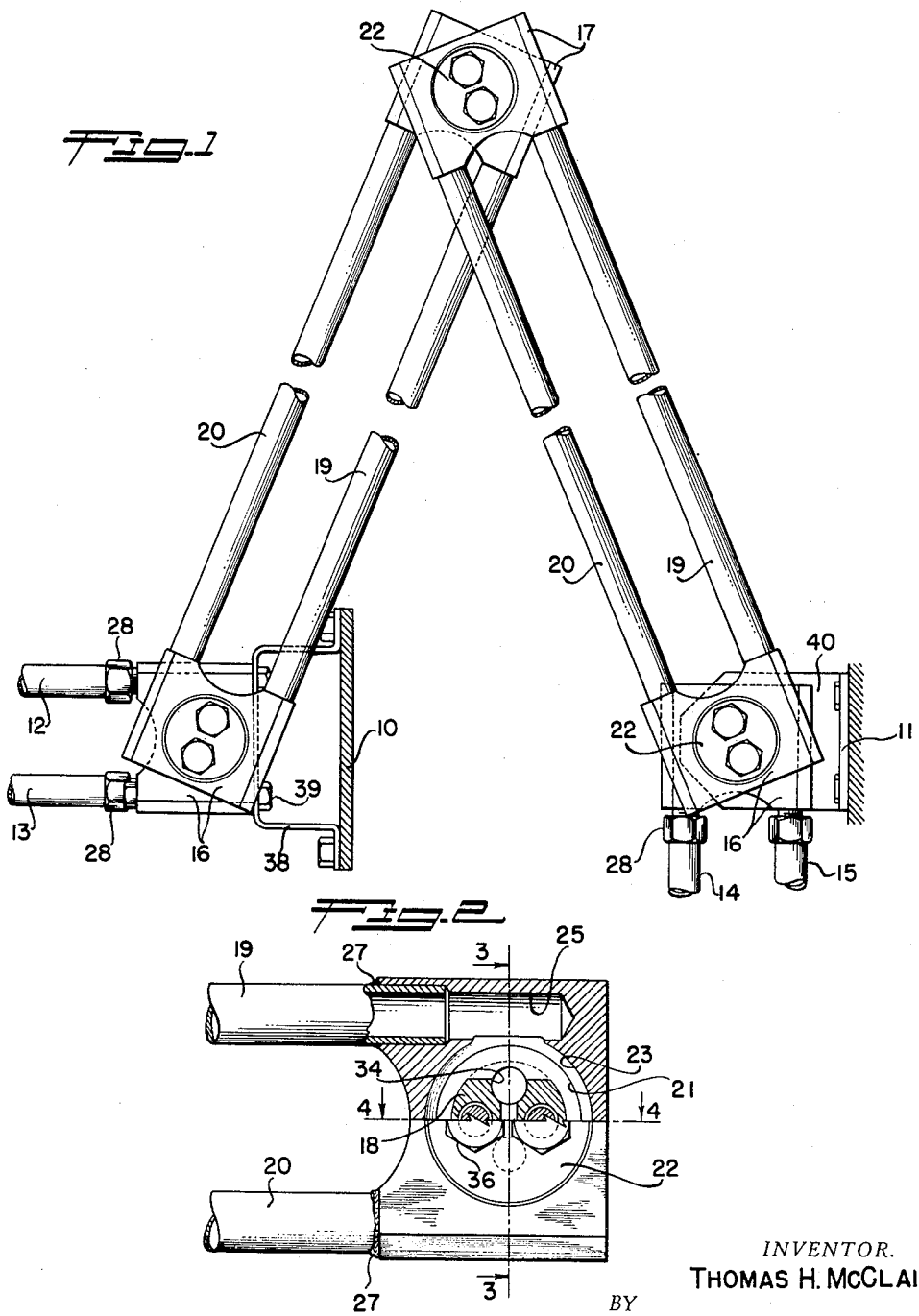
INVENTOR.
THOMAS H. McCLAIN
BY
Agent

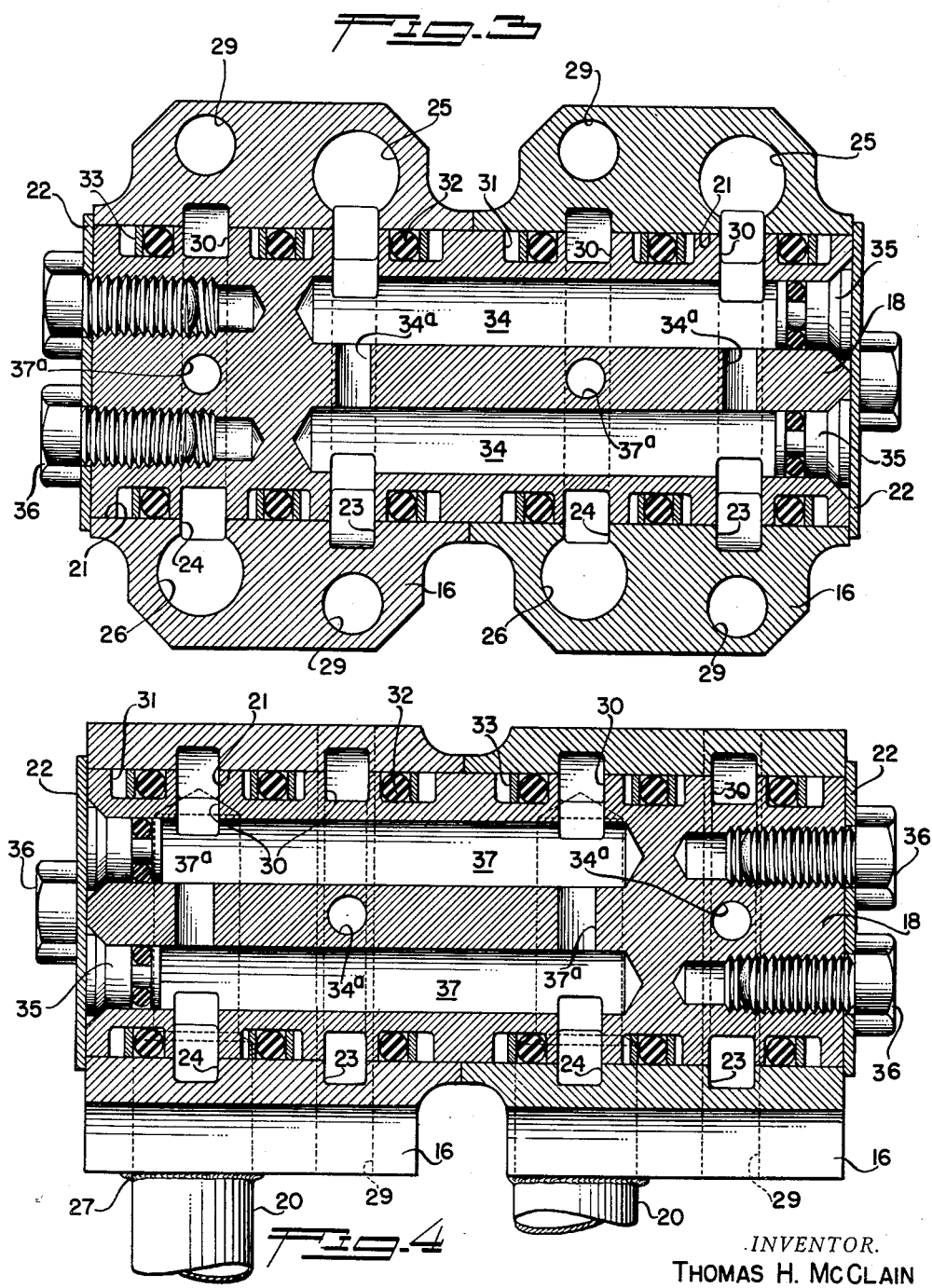

Patented Nov. 17, 1953

2,659,615

UNITED STATES PATENT OFFICE 2,659,615

DUAL HYDRAULIC SWIVEL JOINT

Thomas H. McClain, Altadena, Calif., assignor to
Lockheed Aircraft Corporation, Burbank, Calif.

Application June 21, 1949, Serial No. 100,435

1 Claim. (Cl. 285—96.3)

This invention relates to hydraulic swivel or swing joints adapted to carry pressure fluids to and from a movable or telescoping mechanism, either as supply and return lines, as, for example, to a hydraulic motor or a double acting hydraulic cylinder; or as dual lines to separate hydraulic mechanisms.

In providing high pressure hydraulic lines to relatively movable parts or mechanisms it has heretofore been the practice to use flexible hoses, telescoping or trombone tube connections, or swivel joints with or without nut-cracker or scissors linkage. Heretofore, each connection had to be set up separately and independently so that parallel lines, as for supply and return connections or dual functions, required independent duplication of fittings and swivels, joints, or the like. By way of example, without restricting the present invention thereto, a retractable airplane landing gear having a telescoping shock strut and dual brakes would require two separate hydraulic lines each having one set of swivel joints at the strut pivot point and another set of swivel joints and scissors connections at the telescoping part of the strut. The present invention relates to combining the two separate connections or linkages into a dual linkage simultaneously providing two separate hydraulic lines in the space normally required by a single line, and capable of large rotational and/or translational movements.

It is accordingly an object of this invention to provide an improved swivel or swing joint arranged to provide dual hydraulic circuits which provide fluid to double acting or dual hydraulic mechanisms movable rotationally and/or translationally relative to the source of hydraulic fluid and/or controls therefor.

It is a further object of this invention to provide a dual passaged device of the type described that can be used singly as a swivel or swing joint or in multiple or series to provide a nut-cracker or scissors effect to absorb misalignment or relative movements without change in the volume of the fluid contained therein.

It is also an object of this invention to provide a dual swing joint of the type described that will be in substantial hydraulic balance regardless of variations in hydraulic pressure between the dual hydraulic conduits.

It is still a further object of this invention to provide a compact dual swing joint of the type described capable of carrying high hydraulic pressures in the order of 3000 pounds to the square inch.

Other and further objects of my invention will appear as the detailed description thereof proceeds; a specific embodiment being disclosed in the accompanying drawings wherein:

Figure 1 shows a dual scissors or nut-cracker linkage including the swing or swivel joints of my invention;

Figure 2 is an enlarged view, partly in section, showing one of the joint members of Figure 1; and Figures 3 and 4 are sections, in planes at right angles to each other, of two joint members, such as shown in Figure 2, mounted on a common barrel.

As shown on the drawings, a scissors or nut-cracker arrangement of a plurality of swing or swivel joints is intended to carry dual hydraulic pressure lines from one location 10 to another location 11, where relative motion is expected between the two locations. Examples, without limiting the invention thereto, include reciprocating, traversing, oscillating, or other types of regular or irregular motion of either location respective to the other; such as a reciprocating working table of a machine tool, or a telescoping shock strut for airplane landing gears.

In Figure 1, either side may be considered the relatively movable one, and for convenience in what follows the left hand mounting or location 10 will be considered the fixed side, having a pair of hydraulic lines 12 and 13 leading thereto. Accordingly, the right hand side or location 11 will be considered the movable one, a second pair of hydraulic lines 14 and 15 leading therefrom to either a double acting hydraulic mechanism (not shown) wherein the lines 14 and 15 become supply and return lines; or to separate or dual mechanisms under separate control wherein backflow through the same lines provides for return of the mechanisms, as commonly used in hydraulic brake control lines, for example.

Each of the three pairs of housing members 16 and 17 shown in Figure 1 are identical between the pairs of members pivoted on a common barrel 18, but alternate pairs are of opposite hand. Accordingly, the two pairs of members 16 adjacent to the locations 10 and 11 are identical, and the upper pair of members 17 forming the scissors joint are of opposite hand. Although Figure 2 shows the front member 16 of the left hand pair, as rotated into a horizontal direction, the detailed description will apply to both members 16 and 17 as the only difference is the angular position of the pairs of tubes 19 and 20 connecting the two pairs of members 16 and 17 forming the pairs of scissors linkages.

Referring now to Figures 2, 3 and 4, each housing member 16 is of somewhat block-like form having a central bore 21. Two of these members are mounted side by side on the pivot barrel 18 and are retained thereon by cover plates 22. Spaced annular grooves 23 and 24 are cut into the wall of the bore 21 and are intersected by parallel holes 25 and 26 on opposite sides of the bore 21 for the connecting tubes such as 19 and 20 which may be attached as by brazing 27 or with conventional tube couplings 28. The opposite disposition of the holes 25 and 26 and their corresponding tubes marks the difference between the members 16 and 17; if member 16 is as shown in the detail figures members 17 would have the holes transposed to the opposite corners, where lightening and/or mounting holes 29 are shown in Figure 3.

The barrels 18 for both members 16 and 17 are identical, two members 16 or 17, as the case may be, being mounted side by side on a barrel for independent rotation thereon. Grooves 30 are turned into the barrel to align with the grooves 23 and 24 in the wall of the bore 21 in the member 16 or 17. Suitable seals are mounted in grooves 31 outside of and between the grooves 30, these seals for high pressure service preferably comprising rubber-like O rings 32 with leather back-up rings 33 on one or both sides according to the direction of the pressure. The barrel has a pair of longitudinal holes 34 bored from one end and of sufficient depth to extend from the groove 23 in one member 16 to the corresponding groove in the other member 16 (Figure 3) and the open ends of these bores are sealed by plugs 35. The opposite end of the barrel is drilled and tapped for cap screws 36 which retain the cover plate 22 in place. Longitudinal holes 37, similar to the holes 34, are bored from the opposite end of the barrel in a plane at right angles to the plane of the holes 34 (see Figure 4) to connect the corresponding grooves 24 in the two members 16, the open ends being plugged and covered by a second plate 22 as previously described. The pairs of bores 34 and 37 are interconnected by cross bores 34ª and 37ª to facilitate flow.

The two scissors links formed by the tubes 19 and 20 have a member 16 at one end and a member 17 at the other or joint pivot. These links can be assembled either way, the only requirement being that the two members 16 or 17 mounted on a common barrel must match. I have chosen to show the members 16 as at the fixed and moving locations 10 and 11 with the rearward member 16 fixed to structure at said locations. The mountings for this purpose may form a bracket 38 as shown at the left in Figure 1, where the member 16 is mounted on the bracket by bolts 39 through the lightening holes 29. Alternately, a bracket 40, as shown at the right of Figure 1, may overlie or replace one or more cover plates 22 and support the rear member 16 by means of the cap screws 36. With this latter mounting the barrel is held stationary and both members 16 can swivel thereon, so that the rear member 16 can be turned to best suit the desired layout of the tubes 14 and 15 coupled thereto. While it is convenient to use member 16 to receive the supply and/or return tubes 12, 13, 14 and 15, it will be evident that these members can be specially formed to facilitate their mounting to the associated structure.

In the operation of the device of my invention, it will be assumed that the hydraulic lines 12 and 13 are respectively supply and return lines for some operating device connected to the lines 14 and 15. High pressure fluid from the line 12 enters the rear member 16 (Figure 4) through the bore 26 and thence into the groove 24 in the member 16 and thence into the mating groove in the barrel 18 whence it passes into the two axial bores 37 in the barrel and out of the corresponding bore 26 into the tube 20 to the upper or intermediate scissors pivot in Figure 1, where the flow through the two members 17 is substantially the same. Fluid leaves the front member 17 through a second tube 20 and thence through the pair of members 16 at the location 11, emerging through the line 14.

Return flow through the line 15 enters the member 16 (Figure 3) through the bore 25 and enters the groove 23, barrel groove 30 and axial bores 34 to exit through the adjacent member 16, then the right hand tube 19 to the scissors joint member 17 and the left hand tube 19 to the left hand pairs of members 16 at the location 10 and thence out the tube 13 to the control valve or hydraulic reservoir.

It is to be noted that the two hydraulic circuits just described are maintained separate and independent throughout the mechanical movements of the several parts, so that the separate circuits may be used for either supply and return circuits, for reversible drives, or for parallel or independent operation of separate or dual mechanisms, as for example dual hydraulic brake systems.

Having thus described my invention and the present preferred embodiments thereof, I desire to emphasize the fact that many modifications may be resorted to in a manner limited only by a just interpretation of the following claim.

I claim as my invention:

A swing joint comprising a cylindrical barrel having at least two bores parallel to the axis thereof and extending from opposite ends of said barrel and each terminating short of the other end of said barrel with four separate spaced annular grooves in the surface of the barrel, alternate grooves communicating with one of said bores and the remaining grooves communicating with the other of said bores, a pair of identical housing members embracing the cylindrical surface of said barrel in side by side relationship for separate rotation thereon, each member having a pair of separate internal annular grooves in alignment with and communicating with an adjacent pair of the grooves in the surface of said barrel, separate parallel passageways on each of said members at substantially right angles to the barrel axis and opening on a common face diagonally disposed on either side of said barrel in tangential communication with the separate grooves in said members to provide fluid connections, sealing plugs inserted into the open ends of said bores, end plates attached to said barrel to retain said sealing plugs in position, and sealing means carried by said barrel on each side of each of said grooves to form separate conduits passing from one housing member through the barrel and thence out through the other of said housing member.

THOMAS H. McCLAIN.

References Cited in the file of this patent

UNITED STATES PATENTS

| Number | Name | Date |
| --- | --- | --- |
| 2,343,491 | Bard | Mar. 7, 1944 |
| 2,372,721 | Harcourt | Apr. 3, 1945 |
| 2,434,629 | Taylor | Jan. 13, 1948 |
| 2,481,404 | Donner | Sept. 6, 1949 |